Patented Apr. 2, 1935

1,996,360

UNITED STATES PATENT OFFICE 1,996,360

SOLDERING FLUX

Conral C. Callis, Oakmont, Pa., assignor to Aluminum Company of America, Pittsburgh, Pa., a corporation of Pennsylvania No Drawing. Application December 29, 1932, Serial No. 649,324

2 Claims. (Cl. 148—23)

This invention relates to soldering fluxes for use in the joining of metals and to methods of joining metals by soldering. The invention is particularly concerned with the soldering of aluminum and aluminum base alloys and other metals presenting difficult soldering problems.

The usual soldering flux is a pulverized salt or mixture of salts such as, for instance, zinc chloride, ammonium chloride, etc. Fluxing salts in granular or powdered form are often difficult to apply to the work. Consequently it has been customary to mix the flux with aqueous solutions, grease, oils, waxes or the like to form a paste or liquid which is more readily applied. The vehicles heretofore mixed with the flux are not, however, wholly satisfactory. Some of them vaporize below the soldering temperature and do not spread the flux over the work. Others carbonize to a substantial extent at or below soldering temperatures, deposit a carbonaceous residue, and increase the difficulty of making a satisfactory joint. Others do not adequately serve the intended purpose for these and related reasons.

The present invention is predicated upon the discovery that the chlorinated diphenyls impart the desirable properties heretofore sought, and the invention contemplates the addition of chlorinated diphenyls as a component of the flux.

The chlorinated diphenyls are a class of substances ranging, in physical form, from liquids to solids, from mobile oils to thermoplastic resins, and when made a part of a soldering mixture or flux these chlorinated diphenyls facilitate the spreading of the salts and the uniform coating of the work therewith, and are generally beneficial in promoting the fluxing action and, consequently, the soldering action. Under their influence the solder flows and climbs more readily, and it is readily observed that their presence in the flux causes the soldering operation to proceed more smoothly and with greater ease. Carbonization on any substantial scale is not observed, and difficulties from this source are practically eliminated.

Whether the liquid or solid forms of the chlorinated diphenyls should be used, and the quantity needed to impart the desired properties, depends upon such factors, well understood in the art, as the ease with which the flux can be applied to the work, the temperature attained in the soldering operation, the particular fluxing salts employed, and similar considerations. Where it is possible or desirable to employ a fluxing mixture which is non-mobile, the solid forms of chlorinated diphenyl may be mixed with the fluxing salts and the mixed flux thus formed may be applied directly to the work. At the soldering temperature the solid chlorinated diphenyl will become mobile on the work and will thus serve its general function of spreading the salts over the work area and promoting the soldering operation. Such a procedure may be particularly advantageous where the soldering temperatures are high and the work easily accessible. Generally speaking, it is preferable to use in connection with high soldering temperatures those chlorinated diphenyls having the highest boiling or vaporizing ranges. The physical form of such chlorinated diphenyls is that of a solid or thermoplastic resin.

When the soldering temperatures are relatively low, the mobile chlorinated diphenyls may in some cases be used alone as a vehicle for the other ingredients, to provide a flux which can be applied by dipping the work into it, or by pouring or spraying. When it is desirable or necessary to use a mobile or fluid flux, one important consideration is the fluidity thereof, this term being used partly in the sense of viscosity. The leading function of the chlorinated diphenyl is to deliver to the work a uniform coating of fluxing salt and to spread the salt upon the work, and it is accordingly desirable that the vehicle in which the salts are mixed or suspended be of that consistency (herein generally termed fluidity) which will hold in suspension a substantial proportion of the salts admixed therewith. To achieve this purpose the less fluid chlorinated diphenyls may be mixed with the more fluid to obtain a liquid having the desired fluidity. Or a thinning agent may be used, which will serve to adjust the fluidity of the flux, though it need not take any active part in the function of the mixture as a fluxing agent. The chlorinated diphenyls which best serve their function as an ingredient of a flux for high temperature soldering are those which have relatively high boiling or vaporizing ranges. Such chlorinated diphenyls are usually the less mobile or the solid forms of that class of compounds, and are not fluid enough to serve as a flux component under conditions where a more mobile flux is required. These otherwise useful chlorinated diphenyls can, however, be adjusted in fluidity by the addition thereto of a thinning agent and may in this manner be put into a fluid form.

Thinning agents by which the fluidity of any of the chlorinated diphenyls may be adjusted are the substances known as organic solvents, a class which includes, among other substances, benzol, toluol, xylol and like aromatic hydrocarbons, carbon tetrachloride, cyclo-hexanol, mineral oils (preferably highly refined), and similar solvents. Thus in one form the invention contemplates the use of a flux containing chlorinated diphenyl and adjusted by an organic solvent, it being understood that the latter may be for the purpose of rendering mobile a solid or viscous form of chlorinated diphenyl or for the purpose of obtaining a mobile chlorinated diphenyl which will hold a substantial portion of the soldering salts which are mixed therewith.

An example of the benefits arising from the practice of the invention is the fact that many materials which heretofore have been extremely difficult to solder can be satisfactorily soldered when a flux containing chlorinated diphenyls is used. For example, aluminum-silicon alloys have heretofore been very difficult to solder, probably because of the presence of the metalloid, but when the soldering salts are admixed with chlorinated diphenyl aluminum-silicon alloys can be soldered easily.

I claim:—

1. A soldering flux containing chlorinated diphenyl, fluxing salt, and an organic solvent.

2. A soldering flux consisting of a vehicle containing chlorinated diphenyl and fluxing salt suspended therein.

CONRAL C. CALLIS.